United States Patent Office 3,538,692
Patented Nov. 10, 1970

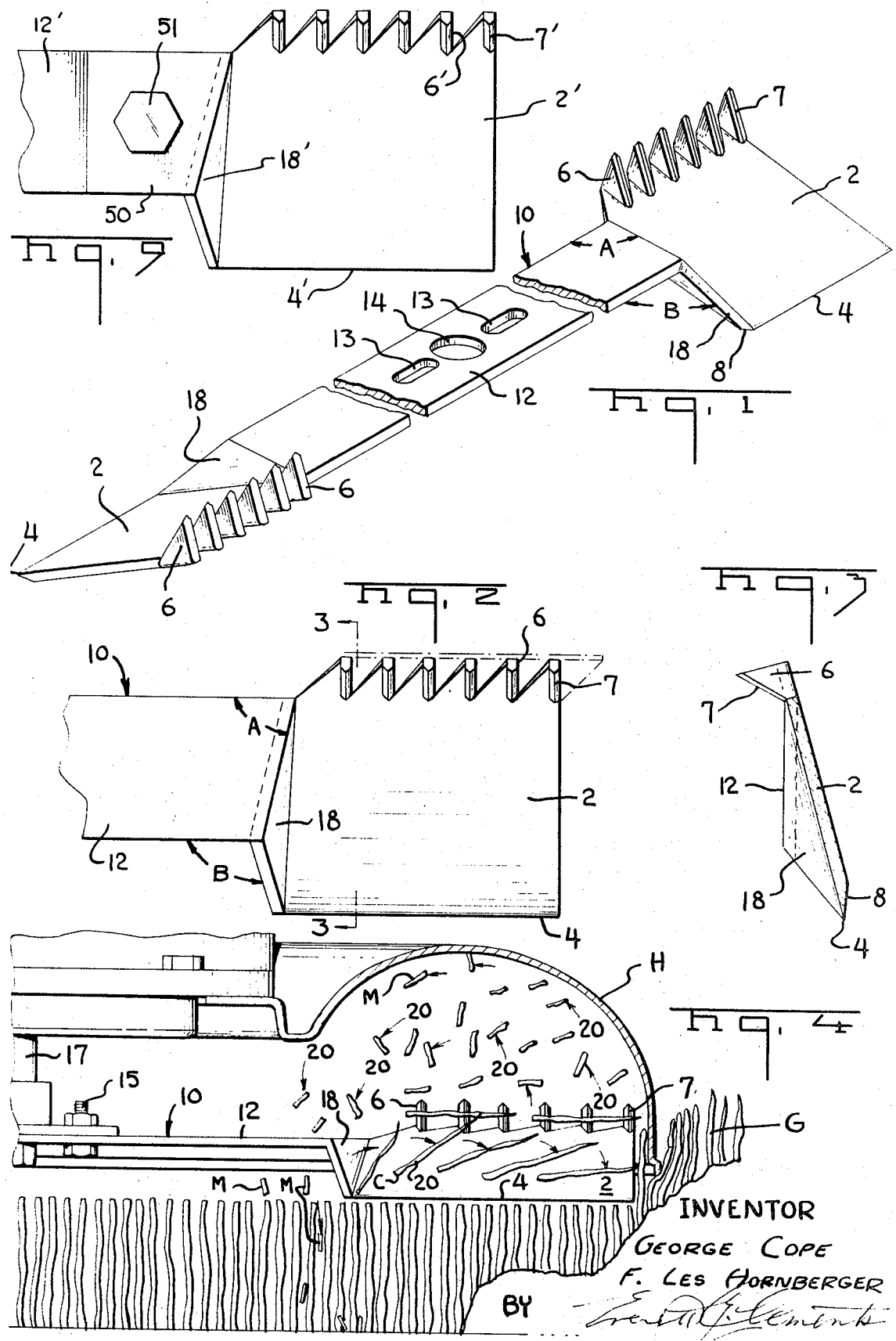

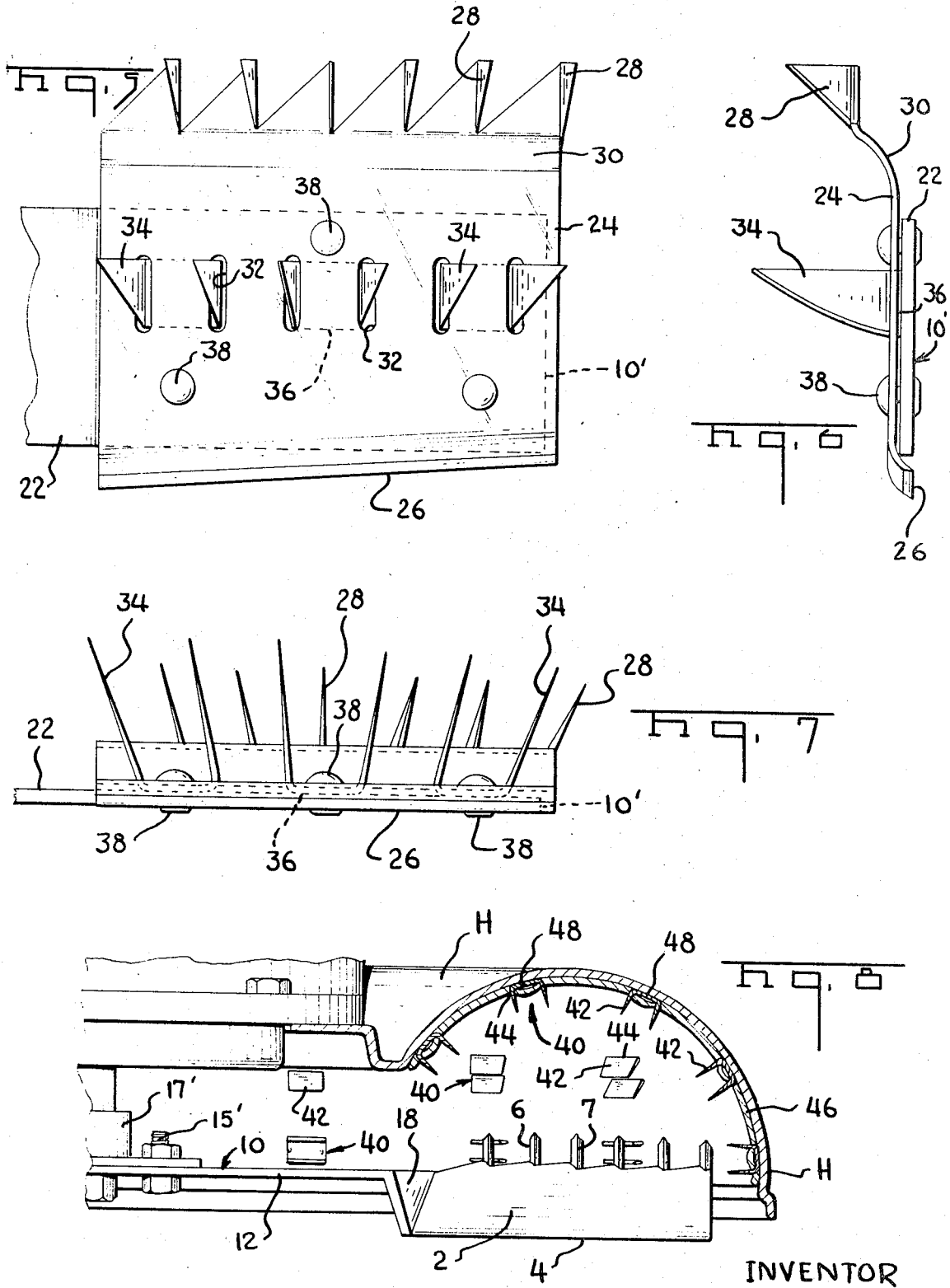

3,538,692
GRASS MOWING AND MULCHING DEVICE
George Cope, 124 E. Tarpon Ave., and Floyd Les Hornberger, 508 Sunshine Lane, both of Tarpon Springs, Fla. 33589
Filed Mar. 19, 1968, Ser. No. 714,234
Int. Cl. A01d 55/18
U.S. Cl. 56—295                                          9 Claims

ABSTRACT OF THE DISCLOSURE

A mower blade for a lawn mower for cutting and mulching grass. The blade is formed inwardly of its ends with an outwardly facing angular wall providing a blower to orient the cut grass with the long axis of the cuttings perpendicular to mulching cutters also carried by the blade; the object being to thereby reduce the cuttings into a fine mulch. In one form of the invention the mower housing is provided with inwardly extending stationary cutting blades which cooperate with the rotating upstanding chopping blades to further pulverize the mulch particles.

This invention relates to a rotary blade type mower for use in domestic power lawn mowers for cutting the grass and particularly to additionally chopping up the cuttings and forming a siftable mulch of the grass cuttings.

When surface vegetation is cut with the conventional type of lawn mower, it is common to use an attached bag for catching the cuttings or to forego the use of the bag and merely rake off the cuttings as a separate operation. Lawn mowers are however, known in which attempts are made to reduce the cuttings to a mulch and thereby eliminate the use of a catcher bag and the raking operation above discussed. However, such prior attempts to produce satisfactory cutting and mulching blades has only resulted in complicated structures which are expensive to produce and do not produce a sufficiently fine product that will automatically and quickly sift through the trimmed grass to the base thereof and provide a satisfactory mulch.

It is therefore an object of this invention to produce a mower blade and structure which is simple in construction and inexpensive to produce as well as satisfactory in use.

It is a further object of this invention to produce the novel blade means as aforesaid which will automatically provide a readily siftable fine mulch.

It is a further object of this invention to provide with the structure just described a mower housing having means which will cooperate with the rotary mower blade to produce an even finer and siftable mulch aforesaid.

It is a further object of this invention to provide a method for consecutively cutting and mulching vegetation which automatically functions to produce in the trimmed grass a fine mulch.

These and other objects of the invention will become manifest upon a reading of the following description in conjunction with the accompanying drawings wherein:

FIG. 1 is a perspective view of a mower blade made in accordance with this invention;

FIG. 2 is a plan view of a section of the blade;

FIG. 3 is a section taken on line 3—3 of FIG. 2;

FIG. 4 is a view in section showing the operation of the blade;

FIG. 5 is a partial plan view of a modified form of blade;

FIG. 6 is an end view of FIG. 5;

FIG. 7 is a front elevation of FIG. 5;

FIG. 8 is a view in section showing chopping blades secured to the mower housing; and FIG. 9 is another plan view showing the grass cutting and mulching end section made separate from the rotating bar to which it is pivotally connected by means of a bolt.

In accordance with the invention the mower blade is preferably made of an integral one piece construction in which the relatively broad cutting portions 2 are planar sections tipped toward the ground. The forward edge portions thereof are ground off and sharpened from the bottom to provide cutting edges and the rear portions are formed with a plurality of upstanding chopping blades 6 in which the cutting or chopping edges are perpendicular to the front cutting edges 4. The inclined planar sections 2 are integral with the intermediate support bar 12 of the blade 10 with the angled plate sections 18 joining these parts being oriented to operate during use as a fan to blow a stream of air over the planar section 2. In one form of the invention the housing of the mower is shown provided with other stationary mulching blades.

With reference to FIG. 1 of the drawing the rotary mower blade 10 thus comprises radially spaced, forwardly inclined cutter blade bodies having relatively wide planar sections 2 with the front edges of each being sharpened on the bottom to provide front cutting edges 4 and the relatively elevated rear edges being provided with vertical spaced chopping blades 6 bent up from the planar section 2 and forwardly sharpened to provide chopping edges 7. A preferred form of construction mounts the planar blade sections 2 inclined at an angle of 45° to the ground and the forward cutting edge 4 is formed by a bottom ground-off and bevelled face 8 making a lesser angle, with the ground, so that the upwardly angled rear portion from the front ground-off edge 8 will not be dragged over the cut grass.

The intermediate relatively narrow supporting section in the form of a central part of the blade 10 comprises a bar which is formed adjacent its center with apertures 13, 14 by which the bar 12 is secured by bolts 15 to the rotary power shaft 17 of the mower. Outwardly angled plate portions 18, integral with both end portions of the bar 12 and connecting the cutter sections 2, at each end portion of the bar make an acute angle A with the upper side of the bar 12 and a wide angle B with the bottom surface of the bar. The angle A is less than 90° and the angle B is preferably not less than 90°. These angles orient the plate portions 18 in proper planes to operate as fan blades to function during operation to blow streams of air radially outwardly over the relatively wide surfaces of cutter sections 2 as the blade 10 is rotated.

In use, the blade 10 is mounted for rotation with the power shaft 17 in an inverted cup-shaped housing H as illustrated in FIGS. 4 and 8. The grass G is cut by relatively fast rotation of the cutting edges 4 on the blade 10 to provide the cuttings C. The air blown radially by the angular fan plates 18 and flowing as indicated and as shown by arrows 20, orients the cuttings C outwardly and laterally of the chopping blades 6 which chops up the cuttings into small particles M that will easily drop or sift between the blades of the cut grass and form a mulch.

In FIGS. 5-7 there is illustrated another form of lower blade 10' comprising a support bar 22 formed with opening means such as 13, 14 (not shown) by which it is secured to the power shaft 17' by machine bolts 15'. The bar member 22 is illustrated as being planar throughout but could be bent up to provide fan plate portions such as 18 in FIGS. 1-4 where it joins the blade body members 24 or the inner end of the blade body 24 may be formed with such an angular fan plate portion. Separable blade body members 24 are formed of sheet metal and each is provided with a forward cutting edge 26 at the forward turned down end portion and a spaced series of chopping blades 28 across the rear edge portion which are bent up from the main blade body member much like the previously described chopper blades 6. The chopper carrying rear portion of each body member is curved upwardly as at 30 to define a fan blade to force air to lift the grass to a vertical position preparatory to cutting. The body is also provided with a plurality of openings 32. A transverse series of independent blades in the form of U-shaped metal strips are inserted with an arm 34 of the U extending through each opening. The bight 36 of the U-shaped blades is thus positioned between body 24 and bar 22 as shown particularly in FIG. 6. Rivets 38 secure the body, blades and bar into a permanent solid unit.

The openings 32 are elongated and arranged intermediate the turned up chopper blades 28 and the front cutting edge 26, so as to position the transverse series of blades 34 in staggered relation with respect to the blades 28. The blades 34 are therefore disposed in a transverse line midway between the forward cutting edge 26 and the elevated series of chopping blades 28. It will be noted that the blades of each series are inclined outwardly from the center of the body 24 as shown in FIGS. 5 and 7.

In use the modification of FIGS. 5-7, with or without a fan means such as 18, operates in a manner generally similar to that of the modification of FIGS. 1-4. The grass cuttings produced by the forward motion of sharp edge 26 as it rotates about the vertical axis sweep over the blade body and in the free spaces in front of the chopping blades, in the absence of a fan means 18, become haphazardly oriented in various directions so that many of them are presented laterally of the forward cutting edges of the chopping blades to enable them to be cut into small pieces to create a mulch. On continued rotation more of the cuttings in the air above the blade body and in front of the chopping blades are cut. The inclined position of the chopping blades facilitates mulching since most of the grass cuttings are apt to be in a non-horizontal position and so more easily cut by inclined cutters than vertical cutters. Inclining the chopping blades in opposite directions from the center presents more variety in direction of inclination without substantial disturbance of the spacing between the chopping blades thus facilitating the mulching operation. When the blade body 24 is used in connection with a fan means such as 18 the grass cuttings tend to be oriented horizontally and radially as shown in FIG. 4 thus greatly enhancing the mulching operation.

In FIG. 8 there is illustrated a modified form of this invention wherein the housing H is here shown as having a liner plate 46 in which are mounted additional chopping blades 42 which are stationary and project inwardly from the inner curved surface of the housing for cooperation with the rotating chopper blades 6 or 28 and 34 as the case may be of the rotary blade 10 or 22 as will be clear from the foregoing. The blades 42 are, of course, relatively stationary and are formed much the same as are the preliminary chopping blades 34 from metal strip bent into U-shape and then extend through opening in the liner plate 46 with the bight of each pair of blades secured between the liner 46 and inner curved surface of the housing H. In operation, a very fine mulch is thus produced by the chopper blades 42 in the same manner as disclosed in FIG. 4 but the particles are further reduced in size by the cooperative chopping action of the stationary cutters 42 against which the chopped grass is thrown by the blades 6, 28 and 34 as the case may be by the rotary force of the mower blade.

In FIG. 9 is shown a further modified form of our invention, where the rotary bar 12' and the relatively wider and downwardly inclined cutter head 2' (only one being shown) are made in separate parts which are pivotally connected by a bolt 51. In this modified form of the grass cutter head 2', the grass chopping blades 6' are turned up as in the head of FIG. 2, with the sharp edges 7' facing forwardly. It will be noted that the grass receiving head is formed with a short leg portion 50 which overlays the rotary bar 12' to which it is pivotally connected so that the head member 2' may swing as required on the bolt 51 during rotation of the bar 12'. The grass cutting edge 4' extends across the entire forward edge of the head as in FIG. 2, normal to the side of the wide grass receiving surface where it adjoins the angular fan producing surface 18'.

We claim:

1. A grass mowing and mulching blade comprising a blade body, means for supporting said blade body for rotation about a vertical axis, the blade body being of generally planar configuration extending radially and transversely with respect to a radius from the axis of rotation, the forward edge of said blade body forming a cutting edge, and a plurality of laterally spaced chopping blades located in a rearward region of the blade body, extending upwardly therefrom and having generally vertically extending forwardly presented cutting edges spaced a substantial distance from the forward cutting edge of said blade body whereby as the blade is rotated the forward edge of the blade body cuts the grass and the grass cuttings are swept over the blade body and are oriented in a position to be cut into small pieces by the chopping blades to form a mulch.

2. A grass mowing mulching blade as in claim 1 in which the blade body is at an acute angle to the ground.

3. A grass mowing and mulching blade as in claim 2 in which the blade carries means to blow a current of air radially outwardly over the blade body whereby the grass cuttings are oriented laterally with respect to the cutting edges of the chopping blades as they travel over the blade body to the chopping blades.

4. A grass mowing and mulching blade as in claim 3 in which the blowing means comprises a plate adjacent an inner edge of the blade body said plate extending generally vertically and with the rear edge of the plate further from the axis of rotation than the forward edge for blowing a current of air radially outwardly.

5. A grass mowing and mulching blade as in claim 4 in which the chopping blades are bent up portions of the rear edges of the blade body.

6. A grass mowing and mulching blade as in claim 5 in which the plate is a shoulder integral with the blade body and the means for supporting said body.

7. A grass mowing and mulching blade as in claim 6 which is of integral, one-piece construction having a said blade body at each end of the supporting means.

8. A grass mowing and mulching blade as in claim 1 in which said chopping blades are located at the rear edge of the blade body and a second plurality of laterally spaced chopping blades are located in a middle region of the blade body, extend upwardly therefrom and have forwardly presented cutting edges spaced a substantial distance from the forward cutting edge of the blade body whereby grass cuttings cut by the forward cutting edge of said blade and swept over the blade body also are oriented in a position with respect to said second plurality of chopping blades.

9. A grass mowing and mulching blade as in claim 8 in which the chopping blades incline outwardly from the centerline of the blade body and the chopping blades of the second plurality of chopping blades are positioned in staggered relation to the first plurality of chopping blades.

References Cited

UNITED STATES PATENTS

| | | | |
|---|---|---|---|
| 2,764,865 | 10/1956 | Pollard | 56—295 |
| 2,786,318 | 3/1957 | Caldwell et al. | 56—295 XR |
| 2,936,564 | 5/1960 | Berry | 56—295 |
| 3,050,925 | 8/1962 | West et al. | 56—295 |
| 3,085,386 | 4/1963 | Slemmons | 56—25.4 |
| 3,340,682 | 9/1967 | Ely | 56—295 |

FOREIGN PATENTS 249,193　8/1962　Australia.

LOUIS G. MANCENE, Primary Examiner

J. A. OLIFF, Assistant Examiner